United States Patent [19]

Brandon

[11] Patent Number: 5,271,712
[45] Date of Patent: Dec. 21, 1993

[54] TURBINE GEOMETRY TO REDUCE DAMAGE FROM HARD PARTICLES

[76] Inventor: Ronald E. Brandon, 627 Jubilee St., Melbourne, Fla. 32940

[21] Appl. No.: 1,522

[22] Filed: Jan. 6, 1993

[51] Int. Cl.$^5$ ............................................. F03B 11/08
[52] U.S. Cl. ............................... 415/121.2; 415/173.7; 277/53
[58] Field of Search ............... 415/121.1, 173.1, 173.6, 415/173.7; 277/25, 53, 67, 68, 133

[56] References Cited

U.S. PATENT DOCUMENTS

| | | | |
|---|---|---|---|
| 3,597,102 | 8/1971 | Unsworth et al. | 415/173.6 |
| 3,944,380 | 3/1976 | Kampe | 415/121.2 |
| 4,402,515 | 9/1983 | Malott | 277/67 |
| 4,696,480 | 9/1987 | Jornhagen | 277/53 |
| 4,721,313 | 1/1988 | Pennink | 277/53 |
| 5,049,032 | 9/1991 | Brandon | 415/173.7 |

FOREIGN PATENT DOCUMENTS

| | | | |
|---|---|---|---|
| 0122002 | 10/1978 | Japan | 415/173.6 |
| 0920236 | 4/1982 | U.S.S.R. | 415/173.6 |

*Primary Examiner*—Edward K. Look
*Assistant Examiner*—Mark Sgantzos
*Attorney, Agent, or Firm*—Ross, Ross & Flavin

[57] ABSTRACT

In a turbine potentially threatened by particulate material and having upstream and downstream stages enclosed within a housing, each stage employing stationary and rotating components, the stationary components including at least one spillstrip holder, at least one spillstrip and at least one tip seal on the spillstrip, the at least one tip seal depending from the spillstrip adjacent the rotating component, the improvement which comprises, a slanted outer side wall on the at least one spillstrip holder, a small scoop on the spillstrip adjacent the tip seal and a small through opening in the tip seal so that the particulate material is discharged relatively quickly from the space adjacent the tip seal either to a special chamber in the stationary component for capturing and storing the particulate material for protecting downstream stages therefrom, or to rejoin the normal steam flow entering the following stage.

2 Claims, 4 Drawing Sheets

1

TURBINE GEOMETRY TO REDUCE DAMAGE FROM HARD PARTICLES

BACKGROUND OF THE INVENTION

1. Field of the Invention

Many steam turbines suffer damage from the passage therethrough of particulate material. The particulate material may come from the boiler, such as spalled oxide from pipes, or as weld beads or slag that is produced when boiler tubes are repaired.

Broken turbine parts are another source of such particles.

These materials roughen and damage the nozzle and bucket profiles and degrade turbine efficiency.

The damage is increased when the particulate material is permitted to become entrapped above the bucket covers and ahead of stationary tip seals. This is a location where the particulate, due to circular motion, is centrifuged to the outer periphery where it cannot easily escape It is normally forced to circulate many times before a lucky bounce allows it to escape. While circulating, the particles bounce between the stationary parts (tip seals, side walls, etc.), and the rotating parts (bucket covers and tenons), causing damage that increases leakage area and threatens the ability of the tenons to hold the bucket covers. The result is poorer efficiency and reliability.

2. Description of the Prior Art

Manufacturers try to prevent the formation and entry of such particulate and use hardened surfaces on nozzles and buckets to minimize damage; but severe damage still occurs in the vicinity of the tip seals and bucket covers.

SUMMARY OF THE INVENTION

One object of the invention is to quickly discharge particulate material that enters the tip seal space.

Another object is to capture the particulate material and store it in a location where it is harmless.

Still a further object of the invention is to minimize damage caused by particulate material to stationary and rotating parts in the vicinity of the tip seals.

The invention is practiced by providing a slanted outer side wall on the stationary parts holding the tip seals for encouraging the particles to move in a downstream direction toward adjacent the tip seals for forcing particulate to be discharged through small openings in the tip seal so that it is discharged relatively quickly from the space above the bucket cover and adjacent the tip seals.

In addition, the space between the stationary diaphragms and the stationary shell which houses the various turbine components, a special chamber accessible to the particulate material is provided in the shell that permits particulate to be captured and stored so that downstream stages will not have to cope with such particles.

DESCRIPTION OF THE PREFERRED EMBODIMENTS

Figure 1:
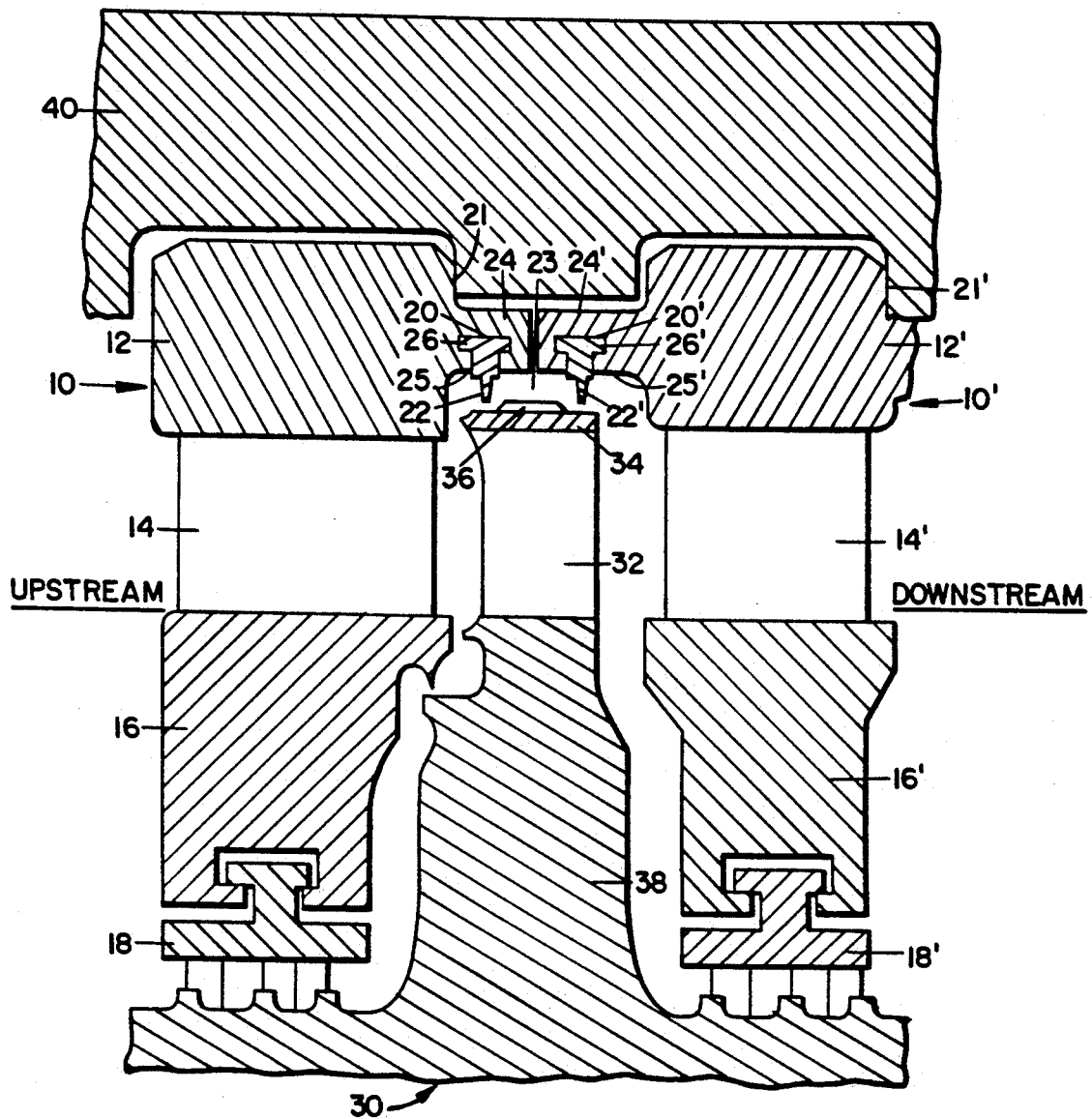
FIG. 1 is a horizontal cross sectional view of a typical prior art multi stage axial flow elastic turbine showing portions of one stage and an adjacent stage.

Referring to FIG. 1, a turbine of the prior art includes multiple stages. A portion of two stages is shown. The earlier or upstream stage includes a stationary diaphragm 10 comprised of an outer ring 12, a nozzle ring 14, inner ring 16, and packing ring 18. A T-shaped radial spillstrip 20 is seated in a complementary groove in a spillstrip holder 24 for ned as an extension on the inner face of outer ring 12.

Spillstrip 20 includes a dovetail in the form of a horizontally disposed cross piece 26, having a centrally-located vertically disposed body member 27 which depends therefrom, with cross piece 26 and body member 27 being seated in complementary grooves in spillstrip holder 24.

A tapered finger-like tip seal 22 depends from the lower end of body member 27 and extends downwardly from a lower or inner face 25 of spillstrip holder 24.

A rotating part 30 of the stage includes a bucket 32, a bucket cover 34, a tenon 36 which secures the cover to the bucket, and a rotor 38 on which the buckets are attached. The various stages are enclosed within a shell 40.

A seal ledge 21 on outer ring 12 forms an interface with shell 40.

In operation, high pressure steam is accelerated to a high centrifugal speed by passage through the nozzles. The centrifugal momentum of the steam is removed during the passage through the rotating buckets 32 and the steam enters a next or downstream stage having a stationary diaphragm 10' which includes an outer ring 12', a nozzle ring 14', an inner ring 16', and a packing ring 18'. A T-shaped radial spillstrip 20' is seated in a complementary groove in a spillstrip holder 24' formed as an extension on the inner face of outer ring 12', with a seal ledge 21' on outer ring 12' forming an interface with shell 40.

Spillstrip 20' includes a dovetail in the form of a horizontally disposed cross piece 26' having a centrally-located vertically disposed body member 27' which depends therefrom, with cross piece 26' and body member 27' being seated in complementary grooves in spillstrip holder 24'.

A tapered finger-like tip seal 22' depends from the lower end of body member 27' and extends downwardly from a lower or inner face 25' of spillstrip holder 24'.

The corresponding rotating elements for the following stage are not shown.

In the process of creating a high circumferential velocity in the steam at the discharge of the nozzle rings 14 and 14', any metallic particles contained in the steam will be centrifuged to the outside of the steam path and some will actually end up in a space 23 adjacent to tip seals 22 and 22' outside of bucket covers 34.

In this location, the particles are essentially captured, being forced to the outside by the centrifugal force and unable to escape because of the tip seals projecting inwardly into space 23 from the lower or inner faces 25 and 25' of spillstrip holders 24 and 24' on the outer rings 12 and 12' respectively. The particles bounce back and forth between the stationary and rotating parts causing damage to the surfaces of both. Ultimately tip seals 22 and 22' can be destroyed, causing decreased efficiency, and tenons 36 so damaged that covers 34 can fly off buckets 32, resulting in severe damage to other turbine components and a lengthy forced outage.

Figure 2:
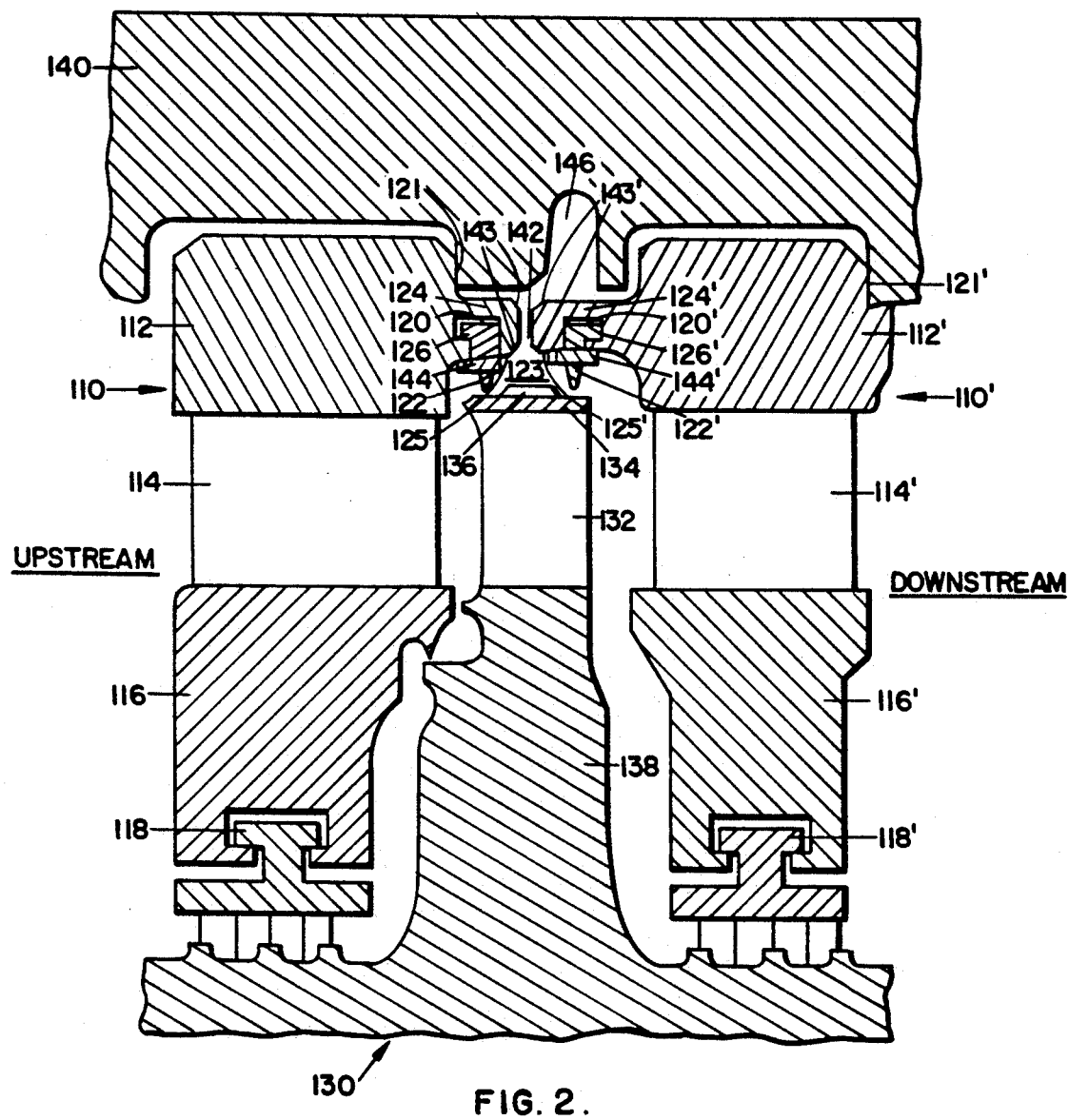
FIG. 2 is a cross sectional view similar to FIG. 1 and incorporating the features of the invention.

Referring to FIG. 2, a turbine incorporating features of the invention includes multiple stages. A portion of two stages is shown. The earlier or upstream stage includes a stationary diaphragm 110 comprised of an outer ring 112, a nozzle ring 114, inner ring 116, and packing ring 118. An inverted L-shaped radial spillstrip 120 is seated in a complementary groove in a spillstrip holder 124 formed as an extension on outer ring 112.

Spillstrips 120 includes a dovetail in the form of a horizontally disposed lip 126 which extends outwardly from a side face of the upper end of vertically disposed body member 127, with lip 126 and body member 127 being seated in complementary grooves in spillstrip holder 124.

A tapered finger-like tip seal 122 depends from the lower end of body member 127 and extends downwardly from a lower or inner face 125 of spillstrip holder 124.

A rotating part 130 of the stage includes a bucket 132, a bucket cover 134, a tenon 136 which secures the cover to the bucket, and a rotor 138 on which the buckets are attached. The various stages are enclosed within a shell 140.

A seal edge 121 on outer ring 112 forms an interface with shell 140.

In operation, high pressure steam is accelerated to a high centrifugal speed by passage through the nozzles. The centrifugal momentum of the steam is removed during the passage through the rotating buckets 132 and the steam enters a next or downstream stage having a stationary diaphragm 110' which includes an outer ring 112', a nozzle ring 114', an inner ring 116', and a packing ring 118'. An inverted L-shaped radial spillstrip 120' is seated in a complementary groove in a spillstrip holder 124' formed as an extension on outer ring 112', with a seal ledge 121' on outer ring 112' forming an interface with shell 140.

Spillstrip 120' includes a dovetail in the form of a horizontally disposed lip 126' which extends outwardly from a side face of the upper end of a vertically disposed body member 127', with lip 126' and body member 127' being seated in complementary grooves in spillstrip holder 124'.

A tapered finger-like tip seal 122' depends from the lower end of body member 127 and extends downwardly from a lower or inner face 125' of spillstrip holder 124'.

The corresponding rotating elements for the following stage are not shown.

As an initial improvement step, the inner walls of spillstrip holders 124 and 124' are slanted to provide an increasing diameter in the direction of flow as shown on surfaces 125 and 125'. This encourages any particles caught in a space 123 above bucket cover 134 to move in the downstream direction.

As a secondary improvement step, the opposed faces of spillstrip holders 124 and 124' are spaced apart a greater distance than the spacing between the opposed faces of spill strip holders 24 and 24' of FIG. 1 to provide a widened passageway 142 to permit particles to exit from space 123 and to be directed toward a storage space 146 where the particles are captured and prevented from doing further damage to the tip seals and tenons; the captured particles are also prevented from damaging downstream stages.

The ends of the opposed faces of spillstrip holders 124 and 124' are chamferred such as at 143 and 143' respectively to facilitate the entrance of particles into passageway 142 and the exit of particles therefrom into storage space 146 in shell 140.

As a third improvement step, each of spill strips 120 and 120' is provided at a selected circumferential location with a scoop 144 and respectively 144'. Scoops 144 and 144' are disposed on the lower faces of body members 127 and 127' of the spill strips and extend obliquely outwardly therefrom adjacent tip seals 122 and 122' and deflect the whirling particles through an opening or cutout 147 in tip seal 122 and a similar opening or cutout, not shown, in tip seal 122' to permit particles to exit from space 123 and rejoin the stream headed toward the next stage, as illustrated in FIG. 4.

Figure 4:
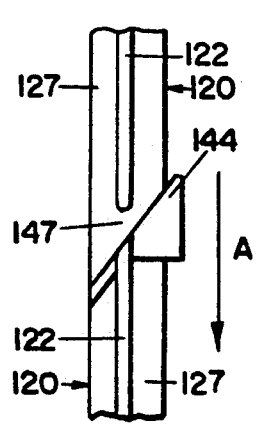
FIG. 4 is a radial fragmentary, bottom plan view of one of the end the tip seals and spill strips of the FIG. 2 turbine stage showing features of the invention.

In FIG. 4, an arrow A indicates the direction of rotor rotation and the desirable relationship between the scoop geometry and the direction of rotation of bucket 132, with opening 147 in spillstrip 120 permitting passage of the particles therethrough.

Figure 5:
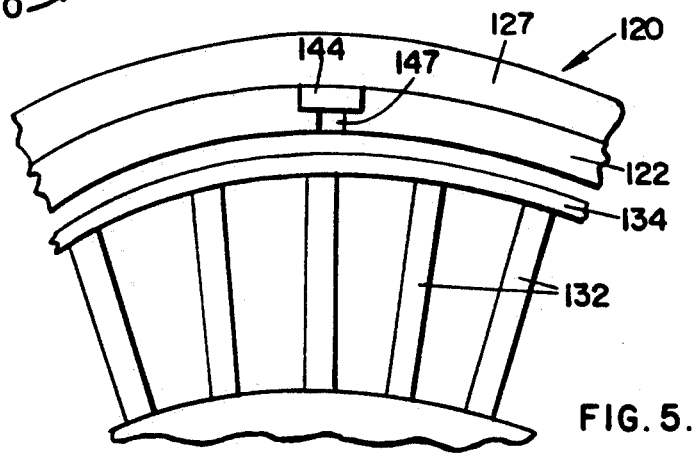
FIG. 5 is a fragmentary side elevational view showing the spillstrip tip seal and scoop of the invention the spillstrip holder having been omitted for purposes of clarity.
Figure 6:
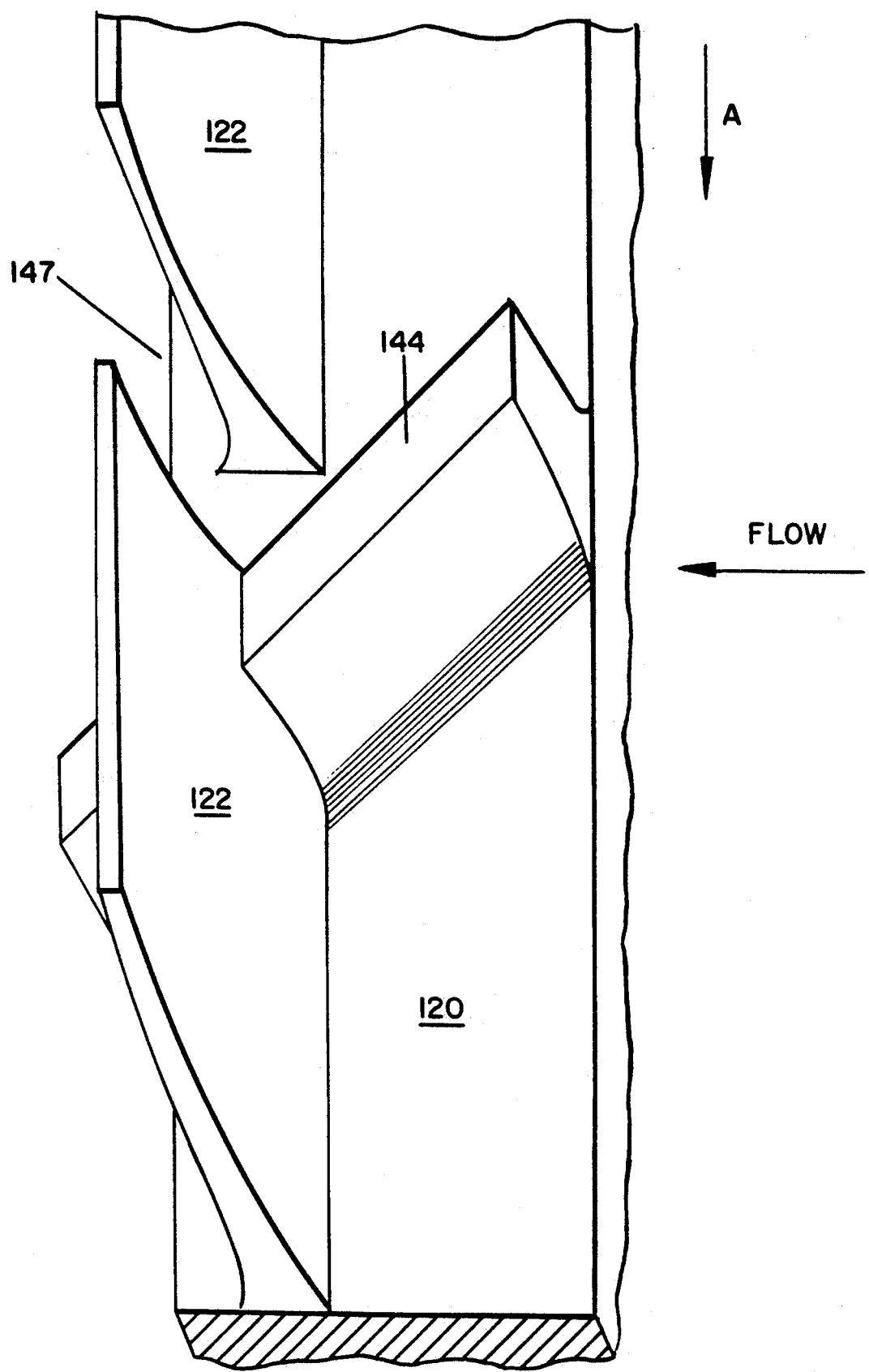
FIG. 6 is an enlarged, fragmentary perspective view of the tip seal and scoop.

The scoop arrangement is further illustrated in FIGS. 5 and 6.

These improvements in stage design will provide greatly reduced damage, performance loss, forced outage and maintenance costs.

FIG. 2 illustrates a stage with two spillstrips, one held in each diaphragm. It will be recognized that frequently a stage may employ only one spillstrip, as illustrated in FIG. 3.

Figure 3:
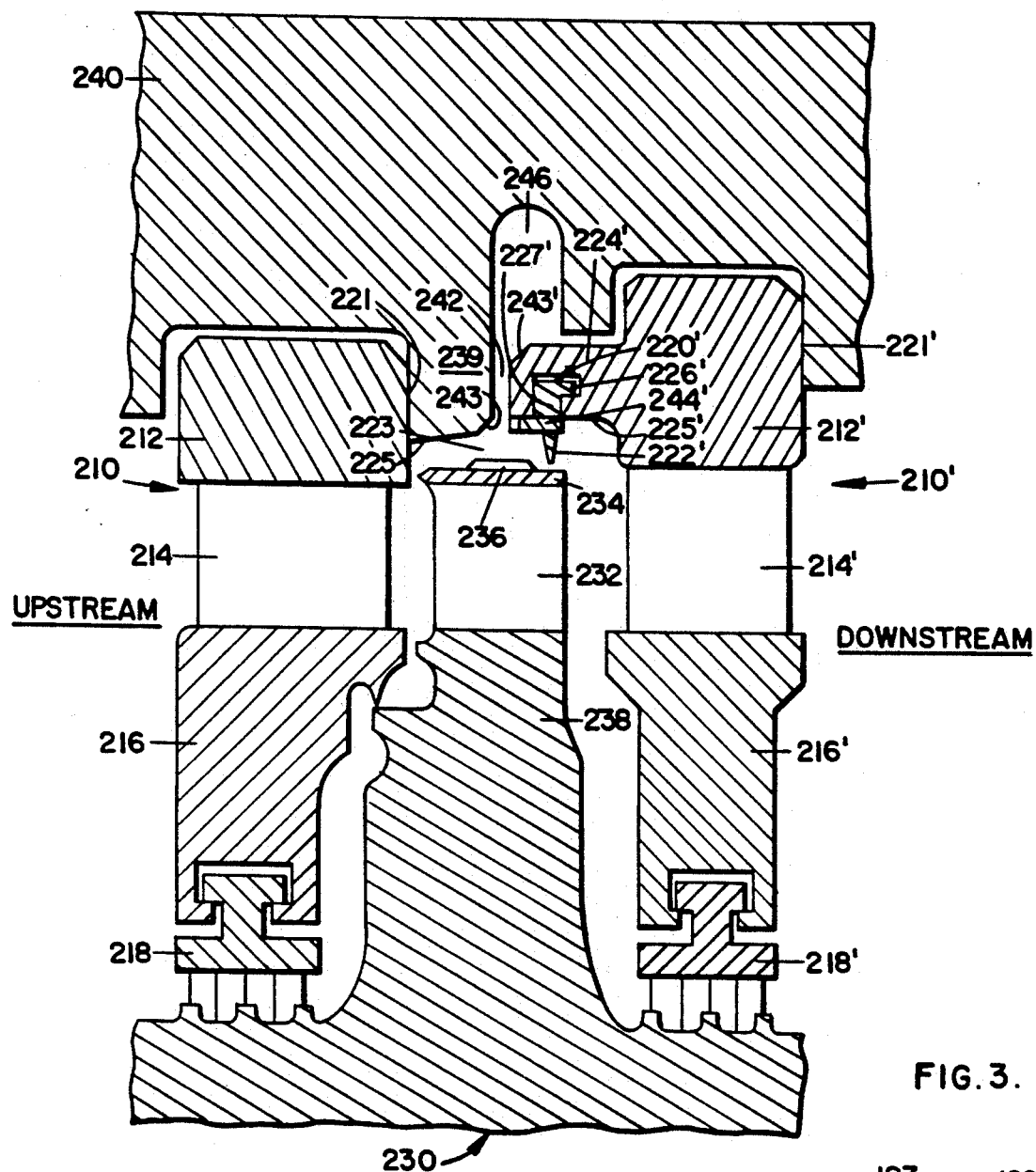
FIG. 3 is a cross sectional view of an alternate turbine stage with one-tip seal and incorporating the features of the invention.

Referring to FIG. 3, a turbine incorporating features of the invention as applied to a single spillstrip includes multiple stages. A portion of two stages is shown. The earlier or upstream stage includes a stationary diaphragm 210 having an outer ring 212, a nozzle ring 214, an inner ring 216, and a packing ring 218, with outer ring 212 not having a spillstrip, but being positioned in an opening provided in a depending portion 239 of a shell 240, with a seal ledge 221 on outer ring 212 forming an interface with depending portion 239.

A rotating part 230 of the stage includes a bucket 232, a bucket cover 234, a tenon 236 which secures the cover to the bucket, and a rotor 238 on which the buckets are attached.

A downstream stage positioned in spaced adjacency to bucket 232 and rotor 238 includes a stationary diaphragm 210' an outer ring 212', a nozzle ring 214', inner ring 216', and a packing ring 218. An inverted L-shaped radial spillstrip 220' with a tip seal 222' is seated in a complementary groove in a spillstrip holder 224' formed as an extension on the inner face of outer ring 212', and enclosed within shell 240.

Spillstrips 220' includes a dovetail in the form of a horizontally disposed lip 226' which extends outwardly from a side face of the upper end of a vertically disposed body member 227', with lip 226', and body member 227' being seated in complementary grooves in spillstrip holder 224'.

A tapered finger-like tip seal 222' depends from the lower end of body member 227' and extends downwardly from a lower or inner face 225' of spillstrip holder 224'.

The inner walls of depending portion 239 and spillstrip holder 224' are slanted to provide an increasing diameter in the direction of flow as shown on surfaces 225 and 225'. This encourages any particles caught in space 223 above bucket cover 234 to move in the downstream direction.

The opposed faces of depending portion 239 of shell 240 and spillstrip holder 224' are spaced apart a greater distance than the spacing between the opposed faces of spillstrip holders 24 and 24' of FIG. 1 to provide a widened passageway 242 to permit particles to exit from space 223 and to be directed toward a storage space 246 in shell 240 where the particles are captured and prevented from doing further damage to the tip seals and tenons. The captured particles are also prevented from damaging downstream stages The ends of the opposed faces of depending portion 239 and spillstrip holder 224' are chamferred as at 243 to facilitate the entrance of particles into passageway 242 and the exit of particles therefrom into storage space 246.

Spillstrip 220' is provided with a scoop 244' which is located at a selected circumferential location and is disposed on the lower face of body member 227' of the spillstrip and extends obliquely outwardly therefrom adjacent tip seal 222'.

Scoop 244' deflects whirling particles through an opening or cutout, not shown, in tip seal 222 similar to opening or cutout 147 of FIGS. 4–6, to permit particles to exit from space 223 and rejoin the steam headed toward the next stage.

It will be understood that two spillstrips may be held in an appendage fastened to one diaphragm or the spillstrips may be mounted in the shell instead of in a diaphragm appendage. In some of these cases, the storage of particles and the application of sloped sidewalls may not be possible, but the application of spillstrip cutouts and scoops would always be possible.

It should be noted that an opening or cutout 147 in tip seal 122 and the openings or cutouts in tip seals 122' and 222', 147' of 0.125 inch width would pass most particles and only increase tip leakage by about 1%. Where larger particles are expected, the cutouts should be made larger.

A preferred location for the tip seal opening or spillstrip cutout would be at the bottom of the stage.

It is further suggested that since scoops 144, 144', 244 and 244' have strong resistance to rubbing and could damage bucket covers 134, 234 should a heavy rub occur, they must be kept far enough from the cover to insure that such a rub will rarely occur. For most stages, a distance of 0.200" would probably be adequate.

Various other modifications of the invention will occur to those skilled in steam turbine disciplines. It is desired to secure by the appended claims, all such modifications that may fall within the true spirit and scope of the invention.

I claim:

1. In a turbine potentially threatened by particulate material and having upstream and downstream stages enclosed within a housing, each stage employing stationary and rotating components, the stationary components including at least one spillstrip holder, at least one spillstrip and at least one tip seal on the spillstrip, the at least one tip seal depending from the spillstrip adjacent the rotating component, the improvement which comprises, a slanted outer side wall on the at least one spillstrip holder for encouraging movement in a downstream direction of particulate material entering the tip seal space toward a small scoop on the spill strip adjacent the tip seal and a small through opening in the tip seal, with the scoop forcing and the particulate material to be discharged into the through opening in the tip seal so that the particulate material is discharged relatively quickly from the space adjacent the tip seal, and a special chamber in the stationary component accessible to the particulate material for capturing and storing same for protecting downstream stages therefrom, thereby minimizing damage caused by the particulate material to stationary and rotating parts in the vicinity of the tip seal.

2. In a turbine according to claim 1, there being a wide passage between the spillstrip holders of adjacent stages for facilitating passage of particulate material from the tip seal space to the special chamber.

* * * * *